(12) United States Patent
Ritter et al.

(10) Patent No.: US 7,396,787 B2
(45) Date of Patent: Jul. 8, 2008

(54) OPTICAL GLASS AND PROCESS FOR MAKING PRECISE-PRESSED OPTICAL ELEMENTS THEREFROM AS WELL AS SAID OPTICAL ELEMENTS

(75) Inventors: Simone Monika Ritter, Mainz (DE); Ute Woelfel, Mainz-Laubenheim (DE); Silke Wolff, Hueckeswagen (DE)

(73) Assignee: Schott AG, Mainz (DE)

( * ) Notice: Subject to any disclaimer, the term of this patent is extended or adjusted under 35 U.S.C. 154(b) by 543 days.

(21) Appl. No.: 11/035,177

(22) Filed: Jan. 13, 2005

(65) Prior Publication Data
US 2005/0159291 A1 Jul. 21, 2005

(30) Foreign Application Priority Data
Jan. 16, 2004 (EP) ................... 04000836

(51) Int. Cl.
 C03C 3/17 (2006.01)
 C03C 3/19 (2006.01)
 C03C 3/21 (2006.01)
 C03C 3/16 (2006.01)

(52) U.S. Cl. ................ 501/48; 501/45; 501/46; 501/47

(58) Field of Classification Search .............. 501/45, 501/46, 47, 48
See application file for complete search history.

(56) References Cited

U.S. PATENT DOCUMENTS

| | | | |
|---|---|---|---|
| 2,381,925 A | | 8/1945 | Pineous et al. |
| 3,216,836 A | | 11/1965 | Jahn et al. |
| 4,022,707 A | * | 5/1977 | Deutschbein et al. . 252/301.6 P |
| 4,105,577 A | * | 8/1978 | Yamashita ............ 501/47 |
| 4,110,245 A | * | 8/1978 | Yamashita ............ 501/87 |
| 4,303,298 A | * | 12/1981 | Yamashita ............ 252/587 |
| 4,391,915 A | * | 7/1983 | Meden-Piesslinger et al. ... 501/48 |
| 4,875,920 A | | 10/1989 | Myers |
| 5,021,366 A | | 6/1991 | Aitken |
| 5,053,360 A | | 10/1991 | Myers et al. |
| 5,526,369 A | | 6/1996 | Hayden et al. |
| 5,668,066 A | * | 9/1997 | Oguma et al. ......... 501/45 |
| 5,824,615 A | | 10/1998 | Chang |
| 6,355,586 B1 | * | 3/2002 | Usui et al. ............ 501/45 |
| 6,409,396 B1 | | 6/2002 | Marker, III et al. |

FOREIGN PATENT DOCUMENTS

| | | |
|---|---|---|
| DE | 1 089 934 | 9/1960 |
| DE | 29 825 | 10/1964 |
| DE | 1 496 064 | 2/1969 |
| DE | 1 596 854 | 3/1971 |
| DE | 27 53 219 | 6/1979 |
| DE | 33 40 968 A1 | 5/1984 |
| EP | 0 481 166 A1 | 4/1992 |
| EP | 1 275 622 | 1/2003 |
| GB | 1 094 538 | 12/1967 |
| JP | 61-36137 | 2/1986 |
| JP | 63-21140 | 1/1988 |
| JP | 2-124743 | 5/1990 |
| JP | 3-218941 | 9/1991 |
| JP | 8-183632 | 7/1996 |
| JP | 9-278479 | 10/1997 |
| JP | 09301735 | 11/1997 |
| JP | 11-349347 | 12/1999 |
| JP | 2002-173336 | 6/2002 |
| WO | 94/08373 | 4/1994 |

OTHER PUBLICATIONS

Derwent Abstract 1990-189633, English abstract of JP 02-124743.*
Patent Abstracts of Japan JP 60 171244 A of Sep. 4, 1985.
Patent Abstracts of Japan JP 56 073644 of Jun. 18, 1981.
Patent Abstracts of Japan JP 60171244 A, Sep. 4, 1985.
Patent Abstracts of Japan JP 56073644 of Jun. 18, 1981.

* cited by examiner

*Primary Examiner*—Jerry A. Lorengo
*Assistant Examiner*—Elizabeth A Bolden
(74) *Attorney, Agent, or Firm*—Michael J. Striker

(57) ABSTRACT

The lead-free, preferably lithium-free, optical glass is useful in imaging, projection, telecommunications, optical communication and/or laser technology, particularly for making precise-pressed optical elements. It has a refractive index $n_d$ of 1.50 to 1.57, an Abbé number vd of 61 to 70. It also has a low transformation temperature of about or below 400° C., good production and processing properties and crystallization resistance. It has a composition, in percent by weight, based on oxide content of $P_2O_5$, 40 to 60; $Al_2O_3$, 1 to 20; $B_2O_3$, 0 to <5; $Na_2O$, 0 to 30; $K_2O$, 0 to 30; $Li_2O$, 0 to <1; $\Sigma M_2O$, >15 to 40; BaO, 1 to 20; ZnO, 1 to 20; SrO, 0 to 5; CaO, 0 to 5; MgO, 0 to 5; and $\Sigma MO$, 5 to 25. In addition, it may contain standard refining agents, although it is preferably free of arsenic and fluorine.

11 Claims, 1 Drawing Sheet

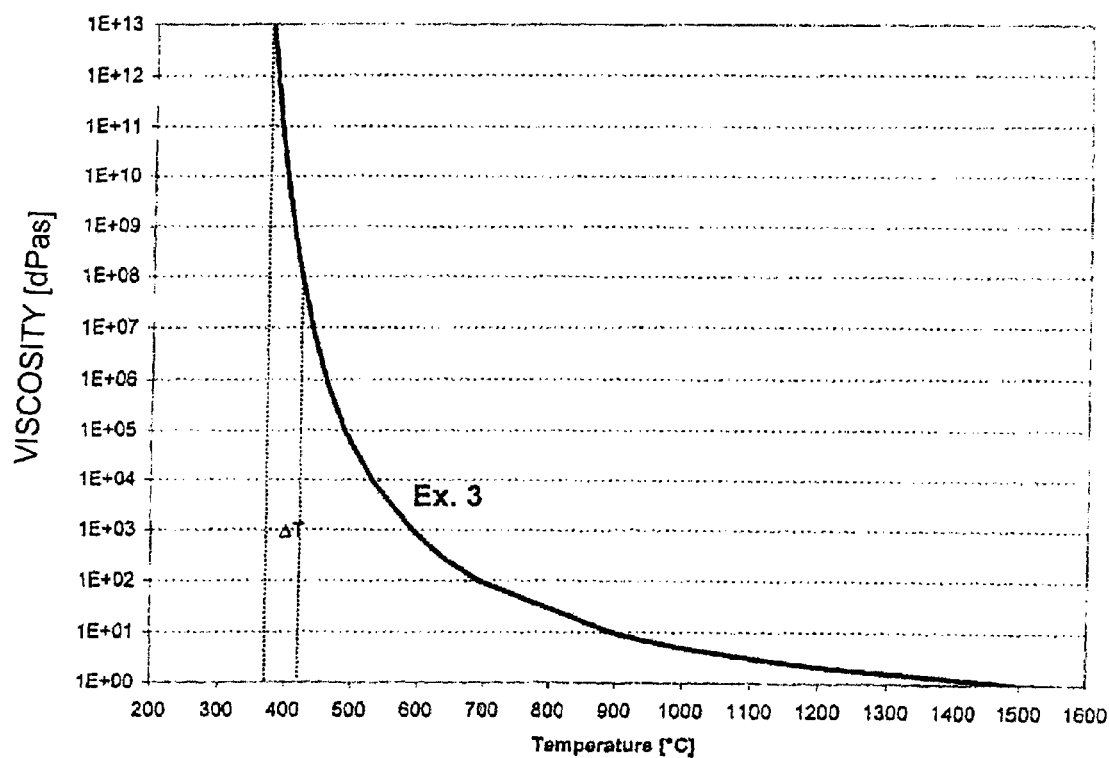

OPTICAL GLASS AND PROCESS FOR MAKING PRECISE-PRESSED OPTICAL ELEMENTS THEREFROM AS WELL AS SAID OPTICAL ELEMENTS

BACKGROUND OF THE INVENTION

1. Field of the Invention

The present invention relates to a lead-free and lithium-free optical phosphate glass, to the use of a glass of this type in the fields of imaging, projection, telecommunications, optical communication technology and laser technology, and also to optical elements or preforms for such optical elements made from this type of glass.

2. Description of the Related Art

In recent years, the market trend in both optical and optoelectronic technologies (the application areas of imaging, projection, telecommunications, optical communication technology and laser technology) has been ever more towards miniaturization. This is evident from the ever-decreasing size of end products and of course requires increasing miniaturization of the individual parts and components of end products of this type. For producers of optical glasses, this development, despite increasing numbers of end products, is associated with a considerable drop in the volume demand for raw glass. At the same time, there is an increasing pressure on prices from the further processors on the glass manufacturers, since the production of smaller components of this type from glass in ingot or bar form entails a significantly greater scrap percentage, based on the product, and the processing of extremely small parts of this type requires a higher outlay than larger components.

Instead of separating glass portions for optical components out of glass in ingot or bar form, as has hitherto been customary, in recent times production processes in which near net shape preforms, such as for example gobs, can be obtained directly from the glass melt. By way of example, there is an increase in demand from the further processors for near net shape preforms for re-pressing, known as precision gobs. Precision gobs are generally understood to be preferably completely fire-polished, semi-free-formed or free-formed glass portions, which have already been divided into portions and have geometry close to the final shape of the optical component.

Precision gobs of this type can advantageously also be transformed into optical elements such as lenses, aspherical components, etc. by the process known as precise pressing or precise molding. There is then no longer any need for further processing of the geometric shape or the surface, for example by surface polishing. This process can flexibly adapt to the smaller volumes of glass melt (distributed between a large number of small pieces of material) by virtue of having short set-up times. On account of the relatively small number of cycles or pieces and given the generally small geometries, the added value of the process, however, cannot originate solely from the value of the materials. Consequently, the products have to leave the press in a state, which is "ready for system installation", i.e. it must be possible to dispense with complex reworking, cooling and/or cold re-machining. On account of the high geometric accuracies required, precision equipment with high-quality and therefore expensive mold materials have to be used for a pressing process of this type. The service lives of molds of this type form a huge part of the economics of the products and/or materials produced. An extremely important factor for achieving a high service life of the molds is for the operating temperature to be as low as possible, but this temperature can only be reduced to an extent, which still leaves the viscosity of the materials to be pressed sufficient for the pressing operation to be carried out. Therefore, there is a direct causal link between the working point and therefore the transformation temperature Tg of a glass, which is to be processed and the economics of a pressing operation of this type: the lower the transformation temperature of the glass, the higher the service lives of the molds and the greater the profit margin. This relationship results in the need for what are known as "low-Tg glasses", i.e. glasses with low melting and transformation points, that is to say glasses, which have a viscosity that is sufficient for processing at the lowest possible temperatures.

A further objective, which has been reported with regard to the process engineering of the melt, has been a recent increased demand for "short" glasses, i.e. for glasses whose viscosity varies considerably with a relatively minor change in the temperature within a certain viscosity range. In the melting process, this behavior has the advantage that the hot-forming times, i.e. the mold closure times, can be reduced. This, on the one hand, increases the throughput, i.e. reduces the cycle time, and, on the other hand, is also gentler on the mold material, which, as has been described above, likewise has a positive effect on the overall production costs. "Short" glasses of this type have the further advantage that on account of the more rapid cooling compared to correspondingly longer glasses it is even possible to process glasses with a relatively high tendency towards crystallization. This avoids preliminary nucleation, which could cause problems in subsequent secondary hot-shaping steps, opening up the possibility of also allowing glasses of this type to be drawn to form fibers.

Furthermore, it is also desirable for the glasses, in addition to the optical properties mentioned and required, to be producible from components that are as inexpensive as possible and to be sufficiently chemically resistant.

Although the prior art has already described glasses with a similar optical position or comparable chemical composition, these glasses have considerable drawbacks. In particular, many of the glasses contain relatively high levels of the relatively expensive component $Li_2O$ and/or of the components, which increase the tendency towards crystallization, such as $TiO_2$.

EP 1 275 622 relates to a glass for pressed bodies with a low softening point. The latter property is achieved by adding very high levels of alkali metals and relatively little $P_2O_5$. The glass must contain at least 6 percent by weight of $Li_2O$.

JP 09-301735 describes an optical glass likewise with a low softening point. In this case too, this property is achieved by adding very high levels of alkali metals and relatively little $P_2O_5$. The glass has to contain a considerable amount of both $Li_2O$ and $TiO_2$.

JP 2002-173336 describes an optical glass with a high refractive index for precise pressing technology. The glass must contain at least 2 percent by weight of $Li_2O$ and must also contain the components $WO_3$, $Nb_2O_5$ and/or $TiO_2$, which are likewise expensive. U.S. Pat. No. 5,053,360 and U.S. Pat. No. 4,875,920 describe ion-exchangeable glasses which always contain at least 5 percent by weight of $Li_2O$.

JP 61-036137 describes a glass with a low melting point; the examples only mention glasses, which contain at least 4 percent by weight of $Li_2O$.

JP 09-278479 describes a low-melting glass, which contains at least one percent by weight of $Li_2O$. Moreover, $Y_2O_3$, $La_2O_3$ and/or $Gd_2O_3$ are mandatory constituents. These are likewise expensive components.

U.S. Pat. No. 6,409,396 describes a glass substrate which, when coated with interference layers, produces an interference filter. The only example cites a glass, which is not lead-free and furthermore also does not contain either BaO or ZnO.

JP 11-349347 describes a crystalline glass composition with a low melting point. It contains at least 0.1 mol percent of $SnO_2$ which functions, inter alia, as an opacifier in the glass. $SnO_2$ only melts at very high temperatures in relatively large quantities in oxide glasses and therefore makes the melting process more difficult.

WO 94/08373 (corresponding to U.S. Pat. No. 5,526,369), JP 63-021240 and DE 33 40 968 relate to laser glass, which must contain laser-active components, such as lanthanoides, and are therefore unsuitable for use as optical glasses.

DE 27 53 219 describes a fogging-free glass, which always contains from 6 to 15 mol percent of $SiO_2$ and/or $B_2O_3$. Both components increase the liquidus point (upper devitrification point, UDP, German: "obere Entglasungsgrenze"), i.e. the temperature range above which no crystals can form in the glass or crystals which are present are dissolved again.

DE 1 596 854 relates to an optical glass with a substantially temperature independent optical path length. The examples cite exclusively glasses, which contain a sum of $M_2O$ of less than 15 percent by weight.

DE 1 089 934 describes an optical crown glass with a low dispersion. A refractive index position of from 1.50 to 1.57 at a dispersion of between 61 and 70 is not reached, however.

U.S. Pat. No. 2,381,925 describes a technical-grade glass with a high chemical resistance which has a $P_2O_5$ content of at least 60 percent by weight. Such a high level of $P_2O_5$ can no longer be added to the batch as a complex phosphate, but rather has to be added as free $P_2O_5$, which results in drawbacks in the melting properties during evaporation and dusting and produces a glass with a poor internal quality.

The same applies to the glasses described in JP 03-218941 for a polarizer in high-energy laser systems containing at least 60 percent by weight of $P_2O_5$. The optical glass described in U.S. Pat. No. 5,824,615 for precise-pressing technology also contains at least 73.9 percent by weight of $P_2O_5$ and also at least 1.1 percent by weight of $Li_2O$.

DE 1 496 064 describes an optical glass, which contains at least 1 percent by weight of $B_2O_3$ and/or $TiO_2$ with the drawbacks outlined above.

DD 29 825 describes a glass with a low refractive index and a high dispersion. It has to contain relatively large quantities of F and $TiO_2$, inter alia, in order to set the optical position, in particular an Abbé number of less than 40. F is a component, which can make the production process more difficult on account of the ease of evaporation.

EP 0 481 166 relates to an optical glass which contains a relatively high ZnO fraction of 34 mol percent. Such a high level of ZnO increases the tendency of the glass to become opaque.

JP 02-124743 relates to an optical glass for precise pressing technology in which, however, the sum of components MO is well below 28 percent by weight.

JP 08-183632 describes a low-melting glass with phosphate content of at most 35 mol percent. It also contains at least 8 mol percent of $B_2O_3$. During melting, problems may arise in so far as a considerable proportion of $B_2O_3$ may be volatilized. Moreover, $B_2O_3$ makes the glass "long" in terms of its viscosity properties and also increases the UDP.

SUMMARY OF THE INVENTION

Therefore, the object of the present invention was to provide an optical glass allowing the desired optical properties ($n_d$, $v_d$) combined, at the same time, with very low transformation temperatures to be achieved even (for ecological reasons) without the use of PbO and as far as possible also without $As_2O_3$, $B_2O_3$, $Li_2O$ and F. It should be possible to process these glasses using the precise pressing process and the glasses should be suitable for the application areas of imaging, projection, telecommunications, optical communication technology and/or laser technology and should have a refractive index $n_d$ of $1.50 \leq n_d \leq 1.57$, an Abbé number $v_d$ of $61 \leq v_d \leq 70$ and preferably as low a transformation temperature as possible $Tg \leq 400°$ C. Furthermore, they should have good melting and processing properties and a sufficient resistance to crystallization, allowing production in continuous equipment. Furthermore, it is desirable for the glass to be as short as possible in a viscosity range from $10^{7.6}$ to $10^{13}$ dPas.

According to the invention the lead-free optical glass has $n_d$ of $1.50 \leq n_d \leq 1.57$, an Abbé number $v_d$ of $61 \leq v_d \leq 70$ and a composition, in percent by weight, based on oxide content of:

| | |
|---|---|
| $P_2O_5$ | 40-60 |
| $Al_2O_3$ | 1-20 |
| $B_2O_3$ | 0-<5 |
| $Na_2O$ | 0-30 |
| $K_2O$ | 0-30 |
| $Li_2O$ | 0-<1 |
| $\Sigma M_2O$ | >15-40 |
| BaO | 1-20 |
| ZnO | 1-20 |
| SrO | 0-5 |
| CaO | 0-5 |
| MgO | 0-5 |
| $\Sigma MO$ | 5-25. |

According to another aspect of the present invention an optical element is provided comprising a lead-free optical glass, which has a refractive index $n_d$ of $1.50 \leq n_d \leq 1.57$, an Abbé number $v_d$ of $61 \leq v_d \leq 70$ and a composition, in percent by weight, based on oxide content of:

| | |
|---|---|
| $P_2O_5$ | 40-60 |
| $Al_2O_3$ | 1-20 |
| $B_2O_3$ | 0-<5 |
| $Na_2O$ | 0-30 |
| $K_2O$ | 0-30 |
| $Li_2O$ | 0-<1 |
| $\Sigma M_2O$ | >15-40 |
| BaO | 1-20 |
| ZnO | 1-20 |
| SrO | 0-5 |
| CaO | 0-5 |
| MgO | 0-5 |
| $\Sigma MO$ | 5-25. |

According to a further aspect the invention a process is provided for producing an optical element comprising the step of:

precise-pressing a lead-free optical glass having a refractive index nd of $1.50 \leq n_d \leq 1.57$, an Abbé number $v_d$ of $61 \leq v_d \leq 70$ and a composition, in percent by weight, based on oxide content of:

| | |
|---|---|
| $P_2O_5$ | 40-60 |
| $Al_2O_3$ | 1-20 |
| $B_2O_3$ | 0-<5 |
| $Na_2O$ | 0-30 |
| $K_2O$ | 0-30 |
| $Li_2O$ | 0-<1 |

-continued

| | |
|---|---|
| ΣM₂O | >15-40 |
| BaO | 1-20 |
| ZnO | 1-20 |
| SrO | 0-5 |
| CaO | 0-5 |
| MgO | 0-5 |
| ΣMO | 5-25. |

According to an additional aspect of the invention a method of using a lead-free optical glass having a refractive index $n_d$ of $1.50 \leq n_d \leq 1.57$, an Abbé number $v_d$ of $61 \leq v_d \leq 70$ and a composition, in percent by weight, based on oxide content:

| | |
|---|---|
| P₂O₅ | 40-60 |
| Al₂O₃ | 1-20 |
| B₂O₃ | 0-<5 |
| Na₂O | 0-30 |
| K₂O | 0-30 |
| Li₂O | 0-<1 |
| ΣM₂O | >15-40 |
| BaO | 1-20 |
| ZnO | 1-20 |
| SrO | 0-5 |
| CaO | 0-5 |
| MgO | 0-5 |
| ΣMO | 5-25, | in the fields of imaging, projection, telecommunications, communication technology and/or laser technology.

BRIEF DESCRIPTION OF THE DRAWING

These and other objects, features and advantages of the present invention will become apparent upon a consideration of the following detailed description and the invention when read in conjunction with the drawing figures. It is to be understood that both the forgoing general description and the following detailed description are merely exemplary of the invention, and are intended to provide an overview or framework for understanding the nature and character of the invention as claimed. The sole FIGURE is a graphical illustration showing the temperature dependence of viscosity of glass in accordance with example 3.

DETAILED DESCRIPTION OF THE PREFERRED EMBODIMENTS

The glasses have an optical position, such as the Abbé number and refractive index, which is common to known optical glasses of similar glass families. However, they are distinguished by good melting and processing properties, low production costs and reduced processing and raw material costs, as well as good environmental compatibility. In particular, these glasses are suitable for near net shape processing, such as for example the production of precision gobs, as well as a precise pressing operation for producing an optical component with its precise final shape. In this context, the viscosity temperature profile and working point of the glasses were preferably set in such a way as to allow hot shaping near net shape or so as to produce the final shape in this way even using sensitive precision machinery.

Moreover, the combination of resistance to crystallization and viscosity temperature profile of the glasses allows thermal (further) processing (pressing or re-pressing) of the glasses or preforms formed from these glasses with scarcely any problems.

In particular, the glasses have a refractive index $n_d$ of $1.50 \leq n_d \leq 1.57$, preferably $1.51 \leq n_d \leq 1.56$, particularly preferably $1.51 \leq n_d \leq 1.54$ and an Abbé number $v_d$ of $61 \leq v_d \leq 70$, preferably $61 \leq v_d \leq 67$, particularly preferably $62 \leq v_d \leq 66$.

According to one embodiment of the present invention, the glasses have a transformation temperature $Tg \leq 400°$ C., preferably $Tg \leq 380°$ C. A "low-Tg glass" is to be understood as meaning a glass with a low transformation temperature Tg, i.e. preferably a Tg of at most 400° C.

The glasses are preferably as short as possible, in particular in a viscosity range from preferably $10^{7.6}$ to $10^{13}$ dPas. In this context, the term "short glasses" is to be understood as meaning glasses whose viscosity varies considerably with only a relatively slight change in the temperature within a defined viscosity range. The temperature range ΔT in which the viscosity of this glass drops from $10^{7.6}$ to $10^{13}$ dPas is preferably at most 100 K, more preferably at most 80 K and most preferably at most 70 K.

FIG. 1 shows the viscosity curve for a glass in accordance with example 3. In FIG. 1, the dotted vertical lines show the temperature range ΔT in which the viscosity of this glass drops from 10 to 10 dPas. ΔT is in this case between 427° C. and 372° C., i.e. is only 55 K.

In the context of the invention, the "internal quality" of a glass is to be understood as meaning that a glass has the lowest possible number of bubbles and/or cords and/or similar defects or preferably does not contain any of them.

In the text which follows, the expression "X-free" or "free of a component X" means that the glass substantially does not contain this component X, i.e. that a component of this type is present at most in the level of impurity in the glass but is not added to the glass composition as an individual component. In this context, X denotes any component, such as for example Li₂O.

In the text which follows, all the details relating to the levels of the glass components are in percent by weight and based on oxide unless stated otherwise.

The basic glass system of the glass is the alkali metal/ phosphate system, which intrinsically represents a good basis for the desired properties.

The glass has a P₂O₅ or phosphate content of at least 40 percent by weight, preferably at least 43 percent by weight, particularly preferably at least 45 percent by weight, and is therefore a low-Tg glass with good melting properties. Reducing the phosphate content to below 40 percent by weight would lead to glasses, which could no longer inherently claim to be a "low-Tg glass". The phosphate content is at most 60 percent by weight, preferably at most 59 percent by weight, particularly preferably at most 55 percent by weight, most preferably at most 52 percent by weight. Increasing the phosphate content further to over 60 percent by weight would cause an excessive reduction in the refractive index.

The glass has an Al₂O₃ content of at least one percent by weight, preferably at least five percent by weight, particularly preferably at least 8 percent by weight. The Al₂O₃ content should be limited to at most 20 percent by weight, preferably at most 15 percent by weight, particularly preferably at most 14 percent by weight. The indicated upper limit of 20 percent by weight should not be exceeded, since otherwise the shortness of the glass in the viscosity range from $10^{7.6}$ to $10^{13}$ dPas is lost on account of the network-forming properties of Al₂O₃. On the other hand, the Al₂O₃ content should not drop below one percent by weight, since otherwise the chemical resistance (acid resistance) of the glass could deteriorate considerably.

According to one embodiment, the sum $\Sigma P_2O_5+Al_2O_3$ is at least 54 percent by weight, more preferably at least 58 percent by weight. If this sum is lower, the glass may have a tendency to crystallize. If this sum is close to 58 percent by weight or even slightly below it, the level of alkaline-earth metal oxides should be as low as possible, and the glass should preferably be free of alkaline-earth metal oxides.

The sum of alkali metal oxides $M_2O$ in the glass is from more than 15 up to 40 percent by weight. The alkali metal oxides $M_2O$ content is preferably at most 35 percent by weight, particularly preferably at most 30 percent by weight, most preferably at most 28 percent by weight. The sum of $M_2O$ should be no more than 40 percent by weight, since otherwise the chemical resistance of the glass may deteriorate and the expansion coefficient may rise excessively. The addition of the alkali metal oxides, in particular $Na_2O$ and $K_2O$, serves to optimize the melting properties, i.e. they act as fluxes. They also make a contribution to lowering Tg, and it is preferable to add, in particular $Na_2O$. $Na_2O$ or $K_2O$ contents of in each case more than 30 percent by weight or a total $M_2O$ content of more than 40 percent by weight have an adverse effect on the chemical resistance of the glass and also greatly increase the coefficient of thermal expansion, which is disadvantageous for processing of the glass in a pressing process. The glass contains more than 15 percent by weight, preferably at least 16 percent by weight and particularly preferably at least 20 percent by weight of $M_2O$.

It is preferable for the only alkali metal oxides $M_2O$ added to the glass to be $Na_2O$ and/or $K_2O$. $Li_2O$ is not preferred, since it is an expensive component. Therefore, the glass contains less than one percent by weight of $Li_2O$, and according to preferred embodiments is $Li_2O$-free.

The glass contains preferably at least 1 percent by weight, more preferably at least three percent by weight, most preferably at least five percent by weight, of $Na_2O$. The glass contains at most 30 percent by weight, preferably at most 20 percent by weight, most preferably at most 15 percent by weight, of $Na_2O$.

The glass may contain preferably at least 1 percent by weight, more preferably at least 15 three percent by weight and most preferably at least five percent by weight of $K_2O$. The $K_2O$ content is at most 30 percent by weight and should preferably not exceed 20 percent by weight. Most preferably it should not exceed 15 percent by weight.

The glass preferably contains a mixture of $Na_2O$ and $K_2O$.

Furthermore, the glass contains one or more components MO which is/are selected from the group consisting of BaO, ZnO and optionally also alkaline-earth metal oxides.

This sum of MO amounts to at most 25 percent by weight, preferably at most 22 percent by weight, and most preferably at most 21 percent by weight.

To flexibly control the viscosity temperature properties and the bonding of phosphate equivalents, at least one percent by weight, preferably at least four percent by weight, particularly preferably at least five percent by weight, of BaO are added to the glass. The BaO content in the glass is at most 20 percent by weight, preferably at most 15 percent by weight, particularly preferably at most 11 percent by weight and most preferably at most 10 percent by weight.

The glass contains at least one percent by weight, preferably at least two percent by weight, particularly preferably at least three percent by weight, most preferably at least five percent by weight, of zinc oxide. The glass contains at most 20 percent by weight, preferably at most 11 percent by weight, particularly preferably at most 10 percent by weight, most preferably at most nine percent by weight, of zinc oxide. ZnO makes a contribution to the desired viscosity temperature properties ("short" glass) in the viscosity range from $10^{7.6}$ to $10^{13}$ dpas.

The glass may if appropriate contain the alkaline-earth metal oxides SrO, MgO and/or CaO, each one of these components independently of one another being present in an amount of at most five percent by weight, preferably at most three percent by weight, most preferably at most two percent by weight.

The glass may furthermore contain further components, such as $TiO_2$ and/or $ZrO_2$, in an amount of preferably less than one percent by weight.

Moreover, the glasses may if appropriate contain $B_2O_3$ in an amount of less than five percent by weight, preferably at most four percent by weight. The strong network-forming properties of $B_2O_3$ increase the stability of the glasses with respect to crystallization and also the chemical resistance. However, it should not be present in amounts of five percent by weight or more, since otherwise the glass network is strengthened excessively and the Tg and melting point of the glass increase undesirably. This also makes the glasses "longer", which is likewise not preferred. Furthermore, some of the added $B_2O_3$ may evaporate during the (initial) melting procedure, making it difficult to accurately set the composition.

Therefore, preferred embodiments of the glass are free of $B_2O_3$.

Furthermore, the glass is preferably free of $SnO_2$ and also of $SiO_2$, which is a network-forming component and therefore increases the transformation temperature.

The glass, as an optical glass, is preferably also free of coloring and/or optically active components, such as laser-active components.

In particular, the glass is preferably also free of components, which are redox sensitive, such as for example Ag, and/or free of components, which are toxic and/or harmful to health, such as for example Tl, Be and As.

According to one embodiment of the present invention, the glass is preferably also free of other components not mentioned in the claims, i.e. according to one such embodiment the glass substantially consist of the components listed. The term "substantially consisting" in this context means that other components are present at most in the form of impurities but are not deliberately added to the glass composition as individual components.

The glass may contain small quantities of standard refining agents. It is preferable for the sum of the refining agents added to amount to at most 2.0 percent by weight, more preferably at most 1.0 percent by weight, these quantities being added in addition to the 100 percent by weight of components of the remaining glass composition. At least one of the following components may be present as refining agent in the glass (in percent by weight in addition to the remaining glass composition):

| | | |
|---|---|---|
| $Sb_2O_3$ | 0-1 | and/or |
| SnO | 0-1 | and/or |
| $SO_4^-$ | 0-1 | and/or |
| F | 0-1. | |

Fluorine and fluorine-containing compounds also tend to evaporate during the (initial) melting operation and consequently make it difficult to accurately set the glass composition. Consequently, the glass is preferably also fluorine-free.

The glasses may, if desired as a result of the application, be tempered and/or provided with a profiled refractive index by means of conventional Na/Ag and/or K/Ag ion exchange.

The phosphate is preferably added to the batch as a complex phosphate. For this reason too, a maximum phosphate content of 60 percent by weight is advantageous, since with a higher phosphate content the proportion of "complex phosphates" decreases in favor of the "free" $P_2O_5$, which can be difficult to control during the melting process and can therefore lead to significantly increased evaporation and dusting effects, associated with a deterioration in internal quality. In addition, a high level of free, i.e. non-complex, phosphate places increased demands on the safety engineering of production operation, which increases production costs. The expression "complex phosphate" means that no phosphate is added to the batch in the form of $P_2O_5$, but rather components such as MO and $M_2O$ are not added to the batch in oxide or carbonate form, for example, but rather as phosphate, for example in the form of barium hydrogen phosphate and/or metaphosphate and alkali metal metaphosphate. This has a very beneficial effect on the ease of production of the glass: the tendency of the batch to form dust can be drastically reduced since complex phosphates can be moistened, unlike free phosphate. Furthermore, the tendency of the glass melt to evaporate decreases. This causes considerably improved homogeneities of the glass melt, reflected in particular in the quality and homogeneity of the optical data of the glass, which is formed. However, in general terms a glass with a high phosphate content, which is otherwise highly susceptible to cords on account of its shortness, is obtained with an improved internal quality in terms of bubbles and/or cords, for example.

The invention also relates to the use of the glasses for the application areas of imaging, projection, telecommunications, optical communication technology and/or laser technology.

The invention also relates to optical elements, which comprise a glass as described above. In this context, optical elements may in particular be lenses, aspherical components, prisms and compact components. The term "optical element" also encompasses preforms of an optical element of this type, such as gobs, precision gobs and the like.

The invention also relates to a process for producing an optical element, comprising the step of precise-pressing a glass as described above.

In the text which follows, the present invention is explained in more detail on the basis of a number of examples. However, the present invention is not restricted to the examples listed.

EXAMPLES

Tables IIa and IIb and IIIa and IIIb describe exemplary embodiments of the invention in the preferred composition range and also a comparative example. The glasses described in the examples were produced as follows:

The raw materials for the oxides, preferably the corresponding carbonates, the phosphate content, preferably as complex phosphates, were weighed out, one or more refining agents, such as for example $Sb_2O_3$ were added, and then the components were thoroughly mixed. The glass batch is melted down at approx. 1150° C. in a continuous melting unit, then refined (1200° C.) and homogenized.

The glass can be poured at a temperature of approximately 950° C. and processed to give the desired dimensions. Experience has shown that the temperatures can be reduced by at least approx. 100 K in the large-volume, continuous unit and the material can be processed using near net shape pressing processes.

TABLE I

COMPOSITION OF A 100 KG BATCH OF RAW MATERIALS USED TO MAKE THE GLASS OF EXAMPLE 3

| Oxide | % by weight | Raw Material | Weighed-in Amount, g |
|---|---|---|---|
| $P_2O_5$ | 50.74 | $NaPO_3$, $KPO_3$, $Ba(H_2PO_4)_2$ | c.f. $Na_2O$, $K_2O$, BaO |
| $Al_2O_3$ | 11.95 | $Al(OH)_3$ | 549.14 |
| $Na_2O$ | 12.22 | $NaPO_3$ | 1208.63 |
| $K_2O$ | 12.70 | $K_2CO_3$ | 792.53 |
| BaO | 6.59 | $Ba(H_2PO_4)_2$ | 439.38 |
| ZnO | 5.5 | ZnO | 164.28 |
| $ZrO_2$ | 0.11 | $ZrO_2$ | 3.29 |
| $Sb_2O_3$ | 0.3 | $Sb_2O_3$ | 5.68 |
| Sum | 100 | | 3244.35 |

The properties of the glass of example 3 obtained in the above-described manner are tabulated in table IIb.

Tables IIa and IIIa describe examples 1 to 8 of glass compositions according to the invention and comparative example 1. Tables IIb and IIIb report the properties of examples 1 to 8 and the comparative example.

All the glasses according to the invention have a Tg of less than or equal to 400° C., are resistant to crystallization and have good processing properties.

Comparative example 1 is a composition which did not produce a glass, but rather crystallization occurred when the composition cooled. It was therefore not possible to determine the optical data.

TABLE IIa

COMPOSITIONS OF EXAMPLES 1 TO 5 OF GLASS ACCORDING TO THE INVENTION

| | Example 1 | Example 2 | Example 3 | Example 4 | Example 5 |
|---|---|---|---|---|---|
| $P_2O_5$ | 46.08 | 51.58 | 50.74 | 50.87 | 58.00 |
| $Al_2O_3$ | 9.09 | 12.31 | 11.95 | 7.83 | 10.50 |
| $\Sigma P_2O_5$, $Al_2O_3$ | 55.17 | 63.89 | 62.69 | 58.70 | 68.50 |
| $Na_2O$ | 13.56 | 11.26 | 12.22 | 5.87 | 12.00 |
| $K_2O$ | 14.08 | 12.59 | 12.70 | 19.57 | 11.00 |
| $\Sigma M_2O$ | 27.64 | 23.85 | 24.92 | 25.44 | 23.00 |
| MgO | — | — | — | 0.98 | — |
| CaO | — | — | — | — | — |
| SrO | — | — | — | — | 1.00 |
| BaO | 9.00 | 6.53 | 6.59 | 5.87 | 4.00 |
| ZnO | 7.62 | 5.44 | 5.500 | 8.81 | 3.00 |
| $\Sigma MO$ | 16.62 | 11.97 | 12.09 | 15.66 | 8.00 |
| $TiO_2$ | — | — | — | — | 0.30 |
| $ZrO_2$ | 0.37 | 0.11 | 0.11 | — | — |
| $B_2O_3$ | — | — | — | — | — |
| $Sb_2O_3$ | 0.20 | 0.18 | 0.19 | 0.20 | 0.20 |
| Sum | 100 | 100 | 100 | 100 | 100 | ingredient amounts are in % by weight based on oxide content

TABLE IIb

PROPERTIES OF EXAMPLES 1 TO 5 ACCORDING TO THE INVENTION

| | Example 1 | Example 2 | Example 3 | Example 4 | Example 5 |
|---|---|---|---|---|---|
| $n_d$ | 1.52111 | 1.52639 | 1.52432 | 1.52525 | 1.52622 |
| $v_d$ | 62.88 | 65.82 | 65.36 | 65.54 | 65.66 |
| $P_{g,F}$ | 0.5451 | 0.5410 | 0.5416 | 0.5426 | 0.5424 |

TABLE IIb-continued

PROPERTIES OF EXAMPLES 1 TO 5 ACCORDING TO THE INVENTION

| | Example 1 | Example 2 | Example 3 | Example 4 | Example 5 |
|---|---|---|---|---|---|
| $\Delta P_{g,F}(10^{-4})$ | 0.0070 | 0.0079 | 0.0078 | 0.0090 | 0.0088 |
| $\tau i(400\ nm)^*$ | — | 0.963 | 0.984 | 0.967 | 0.718 |
| $\tau i(420\ nm)^*$ | — | 0.969 | 0.987 | 0.960 | 0.726 |
| $\alpha_{20-250}^{**}$ | 18.55 | — | — | — | — |
| $\alpha_{20-250}^{**}$ | — | 16.0 | 16.6 | 16.7 | 15.6 |
| Tg (° C.) | 311 | 375 | 372 | 374 | 395 |
| $\rho(g/cm^3)$ | 2.85 | 2.82 | 2.82 | 2.83 | 2.78 |
| $\Delta T^{***}$, K | 63 | 53 | 53 | — | — |

*d = 25 mm;
**$10^{-6} * K^{-1}$;
***$\Delta T = T(\eta = 10^{7.6}\ dPas) - T(\eta = 10^{13}\ dPas)$ TABLE IIIa COMPOSITIONS OF EXAMPLES 6 TO 8 OF GLASS ACCORDING TO THE INVENTION AND OF THE COMPARATIVE EXAMPLE

| | Example 6 | Example 7 | Example 8 | Comparative Example 1 |
|---|---|---|---|---|
| $P_2O_5$ | 52.85 | 58.73 | 46.26 | 38.86 |
| $Al_2O_3$ | 11.77 | 5.00 | 11.95 | 13.44 |
| $\Sigma P_2O_5, Al_2O_3$ | 64.62 | 63.73 | 58.21 | 52.30 |
| $Na_2O$ | 10.77 | 8.00 | 12.22 | 15.36 |
| $K_2O$ | 12.03 | 8.00 | 12.7 | 15.36 |
| $\Sigma M_2O$ | 22.80 | 16.0 | 24.92 | 30.72 |
| MgO | — | — | — | — |
| CaO | 1.46 | — | — | 1.90 |
| SrO | — | — | — | — |
| BaO | 5.74 | 11.00 | 6.59 | 9.60 |
| ZnO | 5.20 | 9.00 | 5.50 | 5.28 |
| $\Sigma MO$ | 10.94 | 20.0097 | 12.09 | 16.80 |
| $TiO_2$ | — | — | — | — |
| $ZrO_2$ | — | 0.10 | 0.11 | — |
| $B_2O_3$ | — | — | 4.48 | — |
| $Sb_2O_3$ | 0.18 | 0.17 | 0.19 | 0.20 |
| Sum | 100 | 100 | 100 | 100 | ingredient amounts are in % by weight based on oxide content

TABLE IIIb

PROPERTIES OF EXAMPLES 6 TO 8 OF GLASS ACCORDING TO THE INVENTION AND OF THE COMPARATIVE EXAMPLE

| | Example 1 | Example 2 | Example 3 | Comparative Example 1 |
|---|---|---|---|---|
| $n_d$ | 1.53003 | 1.53423 | 1.52021 | — |
| $v_d$ | 66.03 | 65.58 | 65.26 | — |
| $P_{g,F}$ | 0.5414 | 0.5409 | 0.5411 | — |
| $\Delta P_{g,F}(10^{-4})$ | 0.0087 | 0.0074 | 0.0071 | — |
| $\tau i(400\ nm)^*$ | 0.953 | 0.894 | 94.6 | — |
| $\tau i(420\ nm)^*$ | 0.961 | 0.899 | 96.1 | — |
| $\alpha_{20-250}^{**}$ | — | — | — | — |
| $\alpha_{20-250}^{**}$ | 15.8 | 15.6 | 16.4 | — |
| Tg (° C.) | 400 | 352 | 378 | — |
| $\rho(g/cm^3)$ | 2.87 | 2.91 | 2.78 | — |
| $\Delta T^{***}$, K | — | — | — | — |

*d = 25 mm;
**$10^{-6} * K^{-1}$;
***$\Delta T = T(\eta = 10^{7.6}\ dPas) - T(\eta = 10^{13}\ dPas)$ The disclosure in European Patent Application 04000836.9-1218 of Jan. 16, 2004 is incorporated here by reference. This European Patent Application describes the invention described hereinabove and claimed in the claims appended hereinbelow and provides the basis for a claim of priority for the instant invention under 35 U.S.C. 119.

While the invention has been illustrated and described as embodied in optical glasses, in particular for precise-pressed optical elements, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A lead-free optical glass having a refractive index $n_d$ of from 1.50 to 1.57, an Abbé number $v_d$ of from 61 to 70 and a composition, in percent by weight, based on oxide content of:

| | |
|---|---|
| $P_2O_5$ | 40-60 |
| $Al_2O_3$ | 1-20 |
| $B_2O_3$ | 0-<5 |
| $Na_2O$ | 1-25 |
| $K_2O$ | 0-30 |
| $Li_2O$ | 0-<1 |
| $\Sigma M_2O$ | >15-40 |
| BaO | 1-20 |
| ZnO | 2-14 |
| SrO | 0-5 |
| CaO | 0-5 |
| MgO | 0-5 |
| $\Sigma MO$ | 5-25, | wherein the optical glass is free of coloring components.

2. The lead-free optical glass as defined in claim 1, wherein said composition comprises from 43-59 percent by weight of said $P_2O_5$, from 4-15 percent by weight of said $Al_2O_3$, from 1-25 percent by weight of said $Na_2O$, from 1-25 percent by weight of said $K_2O$, from 16-35 percent by weight of said $\Sigma M_2O$, from 4-15 percent by weight of said BaO, from 2-14 percent by weight of said ZnO, from 0-3 percent by weight of said SrO, from 0-3 percent by weight of said CaO, from 0-3 percent by weight of said MgO and from 10-25 percent by weight of said $\Sigma MO$.

3. The lead-free optical glass as defined in claim 1, wherein said composition comprises from 45-55 percent by weight of said $P_2O_5$, from 5-14 percent by weight of said $Al_2O_3$, from 3-20 percent by weight of said $Na_2O$, from 3-20 percent by weight of said $K_2O$, from 16-30 percent by weight of said $\Sigma M_2O$, from 5-11 percent by weight of said BaO, from 5-11 percent by weight of said ZnO, from 0-3 percent by weight of said SrO, from 0-4 percent by weight of said CaO, from 0-2 percent by weight of said MgO and from 10-22 percent by weight of said $\Sigma MO$.

4. The lead-free optical glass as defined in claim 1, wherein said composition comprises from 45-52 percent by weight of said $P_2O_5$, from 5-14 percent by weight of said $Al_2O_3$, from 5-15 percent by weight of said $Na_2O$, from 5-15 percent by weight of said $K_2O$, from 20-28 percent by weight of said $\Sigma M_2O$, from 5-10 percent by weight of said BaO, from 5-10 percent by weight of said ZnO, from 0-2 percent by weight of said SrO, from 0-2 percent by weight of said CaO, from 0-2 percent by weight of said MgO and from 10-21 percent by weight of said $\Sigma MO$.

5. The glass as defined in claim 1, further comprising from 0 to 1 percent by weight of $Sb_2O_3$ and/or from 0 to 1 percent by weight of SnO and/or from 0 to 1 percent by weight of $SO_4^-$.

6. The glass as defined in claim 1, which is free of at least one of boron and lithium.

7. The glass as defined in claim 1, which is free of arsenic.

8. The glass as defined in claim 1, which is free of fluorine.

9. An optical element comprising a lead-free optical glass, wherein said lead-free optical glass is defined in claim 1.

10. A process for producing an optical element, said process comprising the step of precise-pressing a lead-free optical glass, wherein said lead-free optical glass is defined in claim 1.

11. A method of using a lead-free optical glass in imaging, projection, telecommunications, communication technology and/or laser technology, wherein said lead-free optical glass is as defined in claim 1.

* * * * *

UNITED STATES PATENT AND TRADEMARK OFFICE
CERTIFICATE OF CORRECTION

| | |
|---|---|
| PATENT NO. | : 7,396,787 B2 |
| APPLICATION NO. | : 11/035177 |
| DATED | : July 8, 2008 |
| INVENTOR(S) | : Ritter et al. |

It is certified that error appears in the above-identified patent and that said Letters Patent is hereby corrected as shown below:

At Column 2, line 16 delete "JP 63-21140" and substitute --JP 63-021240--.

Signed and Sealed this

Twenty-sixth Day of August, 2008

JON W. DUDAS
*Director of the United States Patent and Trademark Office*